United States Patent

Tanaka

Patent Number: 5,253,289
Date of Patent: Oct. 12, 1993

[54] TERMINAL CONNECTION DEVICE

[75] Inventor: Masao Tanaka, Plano, Tex.

[73] Assignee: Murata Kikai Kabushiki Kaisha, Kyoto, Japan

[21] Appl. No.: 723,801

[22] Filed: Jul. 1, 1991

[30] Foreign Application Priority Data

Jul. 4, 1990 [JP] Japan ................... 2-177955

[51] Int. Cl.$^5$ ............................................ H04M 13/00
[52] U.S. Cl. ............................ 379/373; 379/179; 379/372; 379/180
[58] Field of Search ............ 379/372, 373, 377, 387, 379/179, 180, 102, 104, 105, 386

[56] References Cited

U.S. PATENT DOCUMENTS

| | | | |
|---|---|---|---|
| 4,146,754 | 3/1979 | Rose ................... | 379/179 X |
| 4,701,949 | 10/1987 | Lynch et al. ........... | 379/179 |
| 4,720,853 | 1/1988 | Szlam .................. | 379/373 X |
| 4,723,271 | 2/1988 | Grundtisch ............. | 379/179 X |
| 4,935,958 | 6/1990 | Morganstein et al. ..... | 379/386 X |
| 4,959,853 | 9/1990 | Del Monte et al. ....... | 379/180 |
| 4,998,273 | 3/1991 | Nichols ................ | 379/373 |
| 5,062,133 | 10/1991 | Melrose ................ | 379/102 X |
| 5,073,922 | 12/1991 | Okada .................. | 379/373 X |

Primary Examiner—James L. Dwyer
Assistant Examiner—M. Shehata
Attorney, Agent, or Firm—Spensley Horn Jubas & Lubitz

[57] ABSTRACT

A terminal connection device changes and connects a plurality of terminals to one telephone line according to kinds of ringing signal sequences sent through the telephone line. The terminal connection device comprises switches connecting between the telephone line and the terminals, a control circuit commanding ON/OFF operation of the switches, and a photo coupler converting the ringing signal obtained through the telephone line into light signal and inputting the light signal to the control circuit. The control circuit includes a device for judging as to whether a ringing signal sequence sent through the telephone line is the same as the sequence data or not.

5 Claims, 2 Drawing Sheets

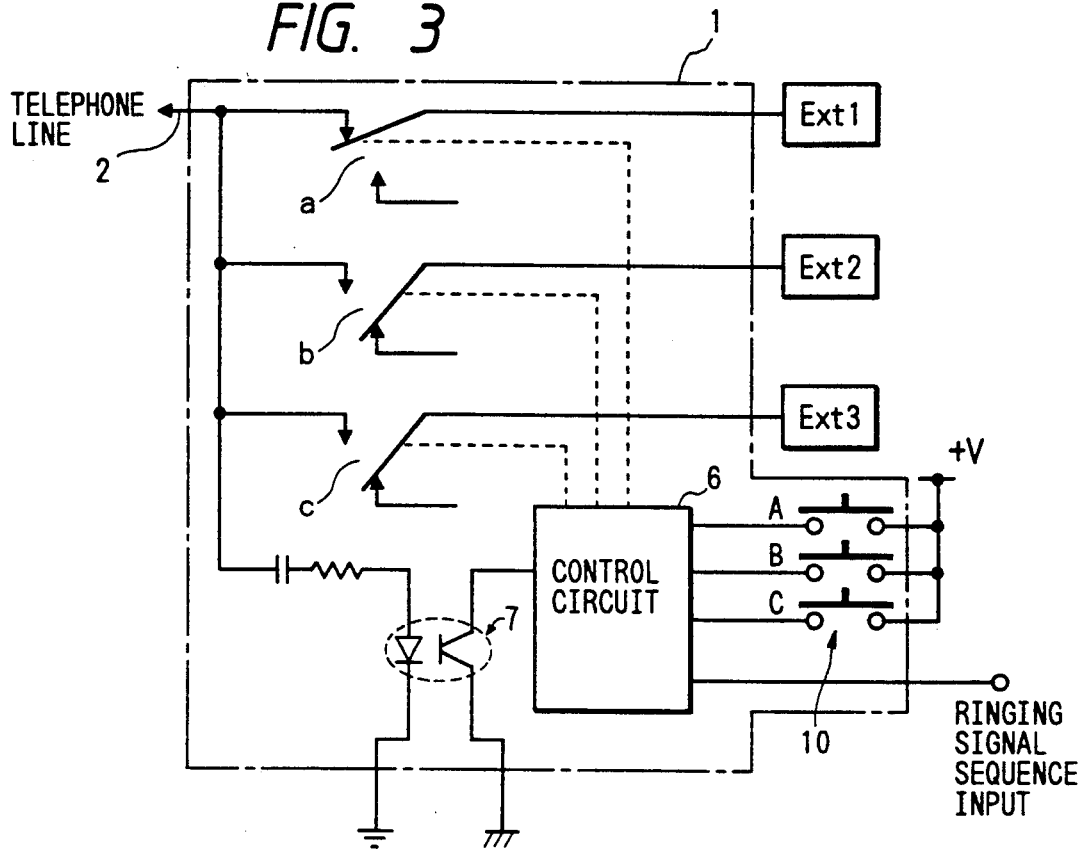
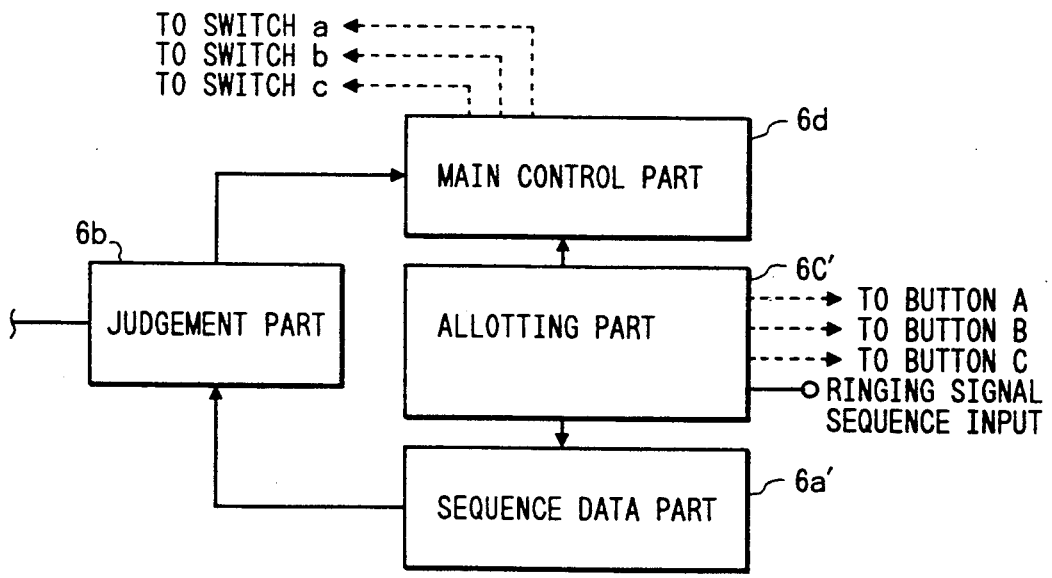

TERMINAL CONNECTION DEVICE

FIELD OF THE INVENTION

The present invention relates to a terminal connection device for transferring and connecting a plurality of terminals according to the kind of ringing signal sequence received through a telephone line (a subscriber's line).

DESCRIPTION OF THE PRIOR ART

A plurality of terminals, such as for a telephone, a facsimile apparatus, a message phone and a computer are often connected to one telephone line. In one prior art method, when a ringing signal is sent, the facsimile apparatus will respond once, monitors signals being sent, and delivers the telephone line to another terminal at a suitable timing according to the signal. Such a method is unsatisfactory because a charge is applied to the calling party because the line is connected once the facsimile apparatus responds.

In one attempt to solve the problem, a plurality of telephone numbers have been allotted to one telephone line is being attempted. For example, telephone numbers (a) ooo-oooo for a telephone, (b) xxx-xxxx for a facsimile apparatus, and (c) △△△-△△△≢ for a computer are allotted, and a ringing signal sequence from an exchange calling (a), (b) and (c) is changed. For example, the sequences of FIG. 5(a), FIG. 5(b), and FIG. 5(c) are for (a), (b) and (c) respectively.

Here, a terminal connection device transferring and connecting a plurality of terminals according to kinds of ringing signal sequence is designed to store necessary sequences, to detect the kinds of sequences having been sent from an exchange, and to connect terminals to the line corresponding to the detected sequence.

However, at the time when service sending a plurality of ringing signals into such a telephone line, it is unknown to what the sequence becomes. Accordingly, there are some problems in that the terminal connection device can not be equipped in advance so as to adapt readily when the services begin.

SUMMARY OF THE INVENTION

In view of the above-mentioned circumstances, an object of the present invention is to provide a terminal connection device capable of being installed in advance, even before the ringing signal sequence is determined, and capable of adapting readily when the service is begun or even when the ringing sequences vary with the installation places.

In order to solve the above-mentioned problems, in a terminal connection device in accordance with a first embodiment of the invention, a plurality of terminals are changed and connected to one telephone line according to the kinds of ringing signal sequences having been sent through one telephone line, and the terminal connection device may include means for judging as to whether a ringing signal being sent is the same as the sequence data or not, and means for holding a ringing signal sequence as sequence data, every time a ringing signal sequence judged being not the same is obtained, and for allotting the held sequence data to each terminal in order.

Also in accordance with a second embodiment of the invention, a plurality of terminals are changed and connected to one telephone line according to the kinds of ringing signal sequences having been sent through one telephone line, and the terminal connection device is characterized by having means for selecting terminals by the operation of an operator, means for holding the sequence of the ringing signals inputted by the operator, and means for allotting the sequence of the inputted ringing signals to the above-mentioned selected terminal.

In accordance with the first embodiment of the invention, the ringing signal sequence sent first after the installation is held as sequence data because of a lack of sequence data, and this ringing signal sequence is allotted to the first terminal. Thereafter in similar manner to this, every time a sequence different from the held sequence data is sent, this sequence is held as sequence data and allotted to next terminal in turn.

That is, since the learning function is provided according to this embodiment, even if it is unknown to what a ringing signal sequence becomes, it can be responded to without any problem, and the installation workers are not involved into troubles.

The second embodiment of the invention can respond promptly on the stage of determination of a ringing signal sequence. That is, the installation workers first select terminals, and input the sequence of the determined ringing signal by means for outputting the ringing signal sequence. At this time, the inputted sequence is held as sequence data, and is allotted to the selected terminal.

BRIEF DESCRIPTION OF THE DRAWINGS

FIG. 3 is a schematic constitution diagram of a terminal connection device as a second embodiment of the invention;

FIG. 4 is an inside constitution diagram of a control circuit in the embodiment.

DESCRIPTION OF PREFERRED EMBODIMENTS

First Embodiment

A first embodiment of the invention will be described with reference to FIG. 1 and FIG. 2.

Figure 1:
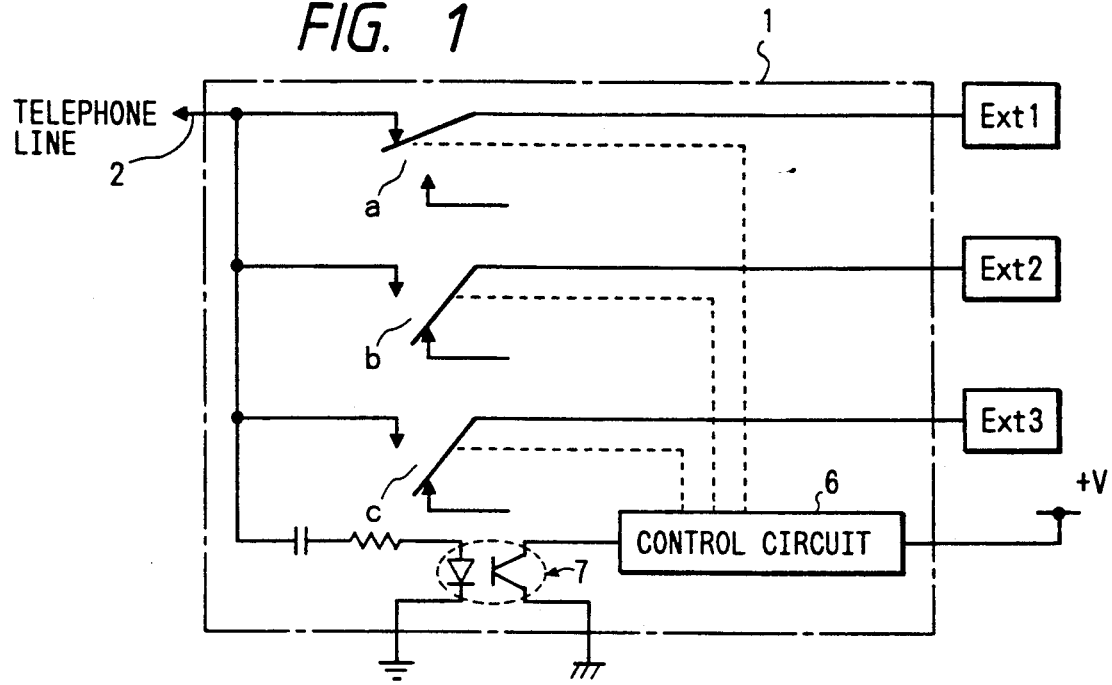
FIG. 1 is a schematic constitution diagram of a terminal connection device as a first embodiment of the invention.

In FIG. 1, a part enclosed by dash-and-dot line is a terminal connection device 1. To the terminal connection device 1 is connected a telephone line 2 and three terminals Ext1-Ext3. The telephone line 2 and the terminals Ext1-Ext3 are connected through switches a, b and c, respectively. Each of the switches a, b and c is turned on or off by a command from a control circuit 6. Further, the telephone line 2 is connected to the control circuit 6 through a photo coupler 7, and the ringing signal obtained through the telephone line is converted into a light signal and inputted to the control circuit 6. In this embodiment, a photo coupler and relay contacts are used, but other elements or circuit constitutions having similar functions may also be used.

Figure 2:
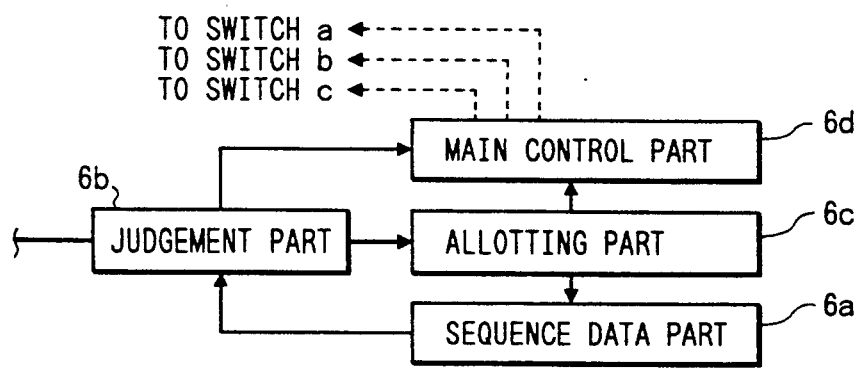
FIG. 2 is an inside constitution diagram of a control circuit in the embodiment.
Figure 5:
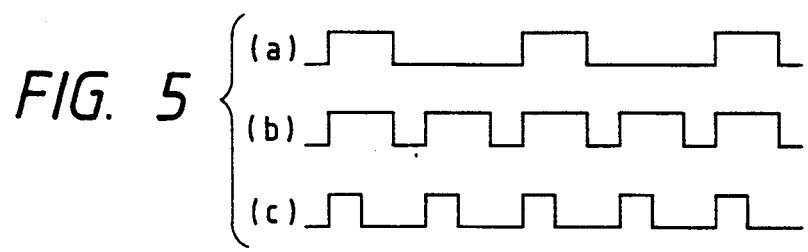
FIGS. 5(a), (b) and (c) are explanation diagrams showing examples of sequences respectively.

The control circuit 6 as shown in FIG. 2 includes a sequence data part 6a, a judgement part 6b which determined whether a ringing signal sequence sent through the telephone line 2 is the same as the sequence data or not, an allotting part 6c which holds a ringing signal sequence as sequence data to the sequence data memory part 6a, every time a ringing signal sequence judged being not the same is obtained, and which allots the held sequence data to the terminals Ext1-Ext3 in turn, and a main control part 6d controlling the ON/OFF operation of the switches a, b and c in response to the ringing signal sequence.

In accordance with the first embodiment, the ringing signal sequence first entering after the installation is held as the sequence data because of an absence of the sequence data memory part 6a, and this ringing signal sequence is allotted to the first terminal Ext1. Of course, the switch a is turned on by the main control part 6d at the same time of the allotting, and the telephone line 2 and the terminal Ext1 are connected together. Thereafter in similar manner to this, every time a sequence different from the held sequence data is sent, this sequence is held as sequence data, and is allotted to next terminals Ext2, Ext3 in turn.

On the other hand, when the same ringing signal sequence as the sequence held already is sent, the allotting processing is not carried out, and any of the switches a, b and c corresponding to the terminal indicated by the signal sequence is only turned on by the main control part 6d.

Thus, even if it is unknown to what the ringing signal sequence becomes, it can be responded without any problem, and the installation workers are not troubled.

Second Embodiment

A second embodiment of the invention will be described with reference to FIG. 3 and FIG. 4. Herein, members having the identical functions with those of the first embodiment are designated by the same reference numerals, and the description shall be omitted.

The second embodiment may include selecting means 10 for selecting terminals Ext1-Ext3 by the operation of an operator is composed of buttons A, B and C. Button A selects the terminal Ext1, button B selects the terminal Ext2, and button C selects the terminal Ext3.

A sequence data memory part 6a' holds a ringing signal sequence being inputted at the prescribed signal generating device by the operator.

An allotting part 6c' allots the sequence of the inputted ringing signal to the selected terminal.

In accordance with the second embodiment, after a ringing signal sequence has been determined, an installation worker pushes one of the buttons A, B and C and selects the terminal, and inputs the ringing signal sequence determined at the signal generating device. Then the inputted sequence is held as sequence data at the sequence data memory part 6a', and is allotted by the alloting part 6c' to the terminal having been selected by any of the buttons A, B and C.

After such an installation work has been done, when a ringing signal is sent through the telephone line 2, any of the switches a, b and c corresponding to the terminal being indicated by the signal sequence is turned on by the main control part 6d, and thus the terminal selection is executed.

According to the present invention as above described, the terminal connection device can be installed in advance even before the ringing signal sequence is determined, and the effect of instant adaptation is taken even when the service is begun or even when the ringing sequences are different with the installation places.

What is claimed is:

1. A device for selectively connecting a telephone line and a plurality of terminals in accordance with ringing signal sequences sent through the telephone line, the device comprising:
    determining means for determining whether a ringing signal sent through the telephone line corresponds to previously stored ringing signal sequence data; and
    control means for storing the ringing signal sequence sent through the telephone line as ringing signal sequence data when the ringing signal sequence sent through the telephone line does not correspond to the previously stored ringing signal sequence data, and for assigning the ringing signal sequence sent through the telephone line to a terminal which does not have a ringing signal sequence assigned thereto.

2. A device for selectively connected a telephone line and a plurality of terminals in accordance with ringing signal sequences sent through the telephone line, the device comprising:
    a plurality of switches connecting the telephone line and the plurality of terminals;
    a photo coupler for converting a ringing signal sequence sent through the telephone line into a light signal; and
    a control circuit adapted to receive the light signal and to control an ON/OFF operation of the switches, the control circuit including
        storage means for storing ringing signal sequence data,
        determining means for determining whether the ringing signal sequence sent through the telephone line corresponds to previously stored ringing signal sequence data,
        control means for storing the ringing signal sequence sent through the telephone line as ringing signal sequence data in the storage means when the ringing signal sequence sent through the telephone line does not correspond to the previously stored ringing signal sequence data, and for assigning the ringing signal sequence sent through the telephone line to a terminal which does not have a ringing signal sequence assigned thereto, and
        main control means for controlling the ON/OFF operation of the switches in response to the ringing signal sequence sent through the telephone line.

3. A device for selectively connecting a telephone line and a plurality of terminals in accordance with ringing signal sequences sent through the telephone line, the device comprising:
    selecting means for selecting a terminal chosen by an operator;
    storage means for storing a sequence of ringing signals inputted by the operator; and
    assigning means for assigning the inputted sequence of the ringing signals to the terminal selected by the selecting means.

4. A device as set forth in claim 3, further comprising:
    a plurality of switches connecting the telephone line and the terminals, each of the switches defining an ON/OFF operation;
    a photo coupler for converting a ringing signal sequence sent through the telephone line into a light signal;
    main control means for receiving the light signal and for controlling the ON/OFF operation of the switches in response to the light signal.

5. A terminal connection device as set forth in claim 3, wherein the selecting means comprises of a plurality of buttons.

* * * * *